US009004126B2

(12) United States Patent
Kameda

(10) Patent No.: US 9,004,126 B2
(45) Date of Patent: Apr. 14, 2015

(54) PNEUMATIC TIRE WITH TREAD HAVING GROOVE AREA RATIO

(75) Inventor: Norifumi Kameda, Roanoke, VA (US)

(73) Assignee: The Yokohama Rubber Co., Ltd., Tokyo (JP)

( * ) Notice: Subject to any disclaimer, the term of this patent is extended or adjusted under 35 U.S.C. 154(b) by 277 days.

(21) Appl. No.: 13/463,270

(22) Filed: May 3, 2012

(65) Prior Publication Data

US 2012/0285592 A1 Nov. 15, 2012

(30) Foreign Application Priority Data

May 10, 2011 (JP) ................................ 2011-105373

(51) Int. Cl.
*B60C 11/03* (2006.01)
*B60C 11/12* (2006.01)
*B60C 11/13* (2006.01)

(52) U.S. Cl.
CPC ............. *B60C 11/0304* (2013.01); *B60C 11/12* (2013.01); *B60C 11/1392* (2013.01); *B60C 11/033* (2013.01); *B60C 2011/0353* (2013.01); *B60C 2011/0381* (2013.01); *Y10S 152/03* (2013.01)

(58) Field of Classification Search
CPC .... B60C 11/0304; B60C 11/12; B60C 11/124
USPC ................................. 152/209.8, 209.9, DIG. 3
See application file for complete search history.

(56) References Cited

U.S. PATENT DOCUMENTS

| 2003/0005992 | A1* | 1/2003 | Radulescu | .................. 152/209.3 |
| 2009/0178745 | A1* | 7/2009 | Ikegami | ..................... 152/209.8 |
| 2010/0116393 | A1* | 5/2010 | Miyazaki | ................. 152/209.18 |
| 2010/0212792 | A1* | 8/2010 | Mita | .......................... 152/209.9 |
| 2010/0263775 | A1* | 10/2010 | Watanabe | .................. 152/209.8 |

FOREIGN PATENT DOCUMENTS

| DE | 3720788 A | * | 1/1988 |
| GB | 555633 A | * | 9/1943 |
| JP | 57-077203 A | * | 5/1982 |
| JP | 02-169306 A | | 6/1990 |
| JP | 2008-195100 A | * | 8/2008 |

(Continued)

OTHER PUBLICATIONS

Machine translation for Japan 2008-195100 (no date).*

(Continued)

*Primary Examiner* — Steven D Maki
(74) *Attorney, Agent, or Firm* — Global IP Counselors, LLP

(57) ABSTRACT

A pneumatic tire for improving steering stability performance on dry and wet road surfaces. The tire tread pattern has circumferential center main grooves, outside and inside main grooves, land sections demarcated by the main grooves, ground contact borders on both sides of the tire, and closed shoulder lug grooves. A ratio Wmax/Wout of a maximum main groove width Wmax and an outside main groove width Wout is at between 1.5 and 2.5 inclusive. A ratio Sin/Sout of a groove area ratio Sin of a region on a tire-widthwise second side of a tire centerline and a groove area ratio Sout of a region on a first side of the tire centerline is at least 1.10 and smaller than 1.25. A groove area ratio of a region on the second side of a tire-widthwise centerline of the intermediate land sections exceeds that of a region on the first side.

21 Claims, 9 Drawing Sheets

(56) References Cited

FOREIGN PATENT DOCUMENTS

| JP | 2008-307950 A | * | 12/2008 |
| JP | 2009-166592 A | | 7/2009 |
| JP | 2010-058781 A | | 3/2010 |
| JP | 2010-215221 A | | 9/2010 |
| JP | 2010-247549 A | | 11/2010 |

OTHER PUBLICATIONS

Machine translation for Japan 2008-307950 (no date).*
Machine translation for German 3,720,788 (no date).*
Office Action of the corresponding Japanese Patent No. 2011-105373, dated Aug. 14, 2012.

* cited by examiner

Circumferential
direction of tire (IN) First side (OUT) Second side

PNEUMATIC TIRE WITH TREAD HAVING GROOVE AREA RATIO

CROSS-REFERENCE TO RELATED APPLICATIONS

This application claims priority to Japanese Patent Application No. 2011-105373, filed on May 10, 2011, the entire disclosure of which is hereby incorporated herein by reference.

BACKGROUND

1. Field of the Invention

The present invention relates to a pneumatic tire. More particularly, the present invention relates to a pneumatic tire having improved steering stability performance on both dry and wet road surfaces.

2. Background Information

With the higher performance levels of vehicles in recent years, there is a stronger demand for a pneumatic tire that can provide stable steering performance on wet road surfaces and stable steering performance on dry road surfaces during high speed travel. In order to improve the steering stability performance of a vehicle on wet road surfaces, pneumatic tires are generally provided with a tread pattern that has many lug grooves and sipes in a tread section to evacuate water efficiently on a wet road surface or ensure the pneumatic tire has grippage on a wet road surface. However, with such a tread pattern, it is difficult to maintain the steering stability performance of the vehicle on dry roads because a mechanical rigidity (tread rigidity) of a land section formed in the tread section declines.

Due to this trade-off relationship, numerous ideas regarding tread patterns have been proposed for achieving good steering stability performance on both drive road surfaces and wet road surfaces. For example, Japanese Laid-Open Patent Application Publication No. 2010-215221 presents a pneumatic tire having four main grooves formed in a region of a tread surface that contacts the ground and five land sections in the tread section, wherein the two center main grooves (of the four) that are positioned toward a tread center are arranged such that a tire equator is disposed between the centers of the two center main grooves and the center of each of the two center main grooves is separated from the tire equator by a distance equal to 8 to 12% of a ground contact width of the tire. The centers of the two main grooves positioned toward both shoulders are each separated from the tire equator by a distance equal to 18 to 32% of a ground contact width of the tire. The groove width of the main groove positioned most toward one side in a widthwise direction of the tire is narrower than the groove widths of the other three main grooves. A ratio Wmax/Wout of a maximum groove width Wmax among the three other main grooves with respect to the groove width Wout of the main groove positioned most toward one side in a widthwise direction of the tire is set to 2.0 to 3.0. Among the five land sections, only the land section positioned most toward one side in a widthwise direction is formed as a string of blocks demarcated with lug grooves and arranged to be separated with a prescribed spacing in a circumferential direction of the tire. The other four land sections are formed as ribs that extend continuously in a circumferential direction of the tire. Additionally, assuming the tire equator is marks a center of the aforementioned ground contact region, a groove area ratio Sin on the tire-widthwise other side of the centerline and a groove area ratio Sout on the aforementioned tire-widthwise one side of the centerline are set such that a ratio Sin/Sout is 1.25 to 1.35, and among the five land sections, each of the three land sections other than the land section positioned farthest toward the other side in the widthwise direction of the tire and the land section positioned farthest toward the one side in the widthwise direction of the tire is configured such that a groove area ratio in the ground contact region of the land section is larger on the tire-widthwise other side of a centerline of the land section than on the tire-widthwise one side of the centerline, the centerline being a circumferential line dividing the land section into two halves separated along a widthwise direction of the tire.

With such a pneumatic tire, the tread rigidity of the land sections in the tread section can be ensured and the steering stability performance on a dry road surface can be improved. Also, since the land section comprising a line of blocks located farthest toward the one side in the widthwise direction of the tire is configured to suppress a decline in rigidity as much as possible, the water evacuation performance can be ensured by the arrangement of the lug grooves and the steering stability performance on wet roads can be improved without causing the steering stability performance on dry roads to decline.

SUMMARY

Due to the higher performance level of vehicles and further advancement of road maintenance, it is difficult to sufficiently improve both the steering stability performance on dry roads surfaces and the steering stability performance on wet road surfaces with conventional tread patterns.

Therefore, an object of the present invention is to provide a pneumatic tire that can improve both the steering stability performance on dry roads surfaces and the steering stability performance on wet road surfaces in comparison with conventional pneumatic tires.

One aspect of the present invention is a pneumatic tire having a first-side side section arranged on an outward side when the tire is mounted to a vehicle and a second-side side section arranged on an inward side when the tire is mounted to a vehicle. A tread section of the pneumatic tire has a plurality of circumferential main grooves made up of four main grooves extending in a circumferential direction of the tire, a plurality of land sections, and a shoulder lug groove. The four main grooves comprise two center main grooves, one inside main groove, and one outside main groove. The two center main grooves are arranged on opposite sides of a tire centerline such that a tire-widthwise center of each of the two center main grooves is separated from the tire centerline by a distance equal to at least 8% and not more than 12% of a ground contact width. The inside main groove is provided on said second side with respect to the center main grooves and arranged such that a tire-widthwise center of the inside main groove is separated from the tire centerline by a distance equal to at least 26% and not more than 32% of the ground contact width. The outside main groove is provided on said first side with respect to the center main grooves and arranged such that a tire-widthwise center of the outside main groove is separated from the tire centerline by a distance equal to at least 26% and not more than 32% of the ground contact width. The land sections are demarcated by the circumferential main grooves and ground contact borders on both sides of the tread section, and each of the land sections extends continuously in a circumferential direction. The shoulder lug groove extends in a widthwise direction of the tire and is provided in an inside land section positioned on the second side with respect to the inside main groove and an outside land section positioned on the first side with respect to the outside main groove. Assuming Wmax is a maximum groove width among the center main grooves and the inside main groove and assuming Wout is a groove width of the outside main groove, the ratio Wmax/Wout is at least 1.5 and not larger than 2.5. A groove area ratio Sin of a region of a ground contact surface located on the second side of the tire centerline and a groove area ratio Sout of a region of the ground contact surface located on the first side of the tire centerline are set such that a ratio Sin/Sout is at least 1.10 and smaller than 1.25, and a groove area ratio of the entire ground contact surface is at least 23% and not larger than 33%. Among the land sections, an intermediate land section demarcated by the inside main groove and the center main groove positioned on the second side of the tire centerline and an intermediate land section demarcated by the outside main groove and the center main groove positioned on the first side of the tire centerline are each provided with a plurality of slanted grooves or sipes such that a groove area ratio of a region on the second side of a centerline dividing the land section in a widthwise direction of the tire is larger than a groove area ratio of a region on the first side of the centerline. The shoulder lug groove has a terminal end that is closed such that it does not communicate with the inside main groove or the outside main groove.

A pneumatic tire according the aspect explained heretofore can improve both a steering stability performance on dry roads surfaces and a steering stability performance on wet road surfaces.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
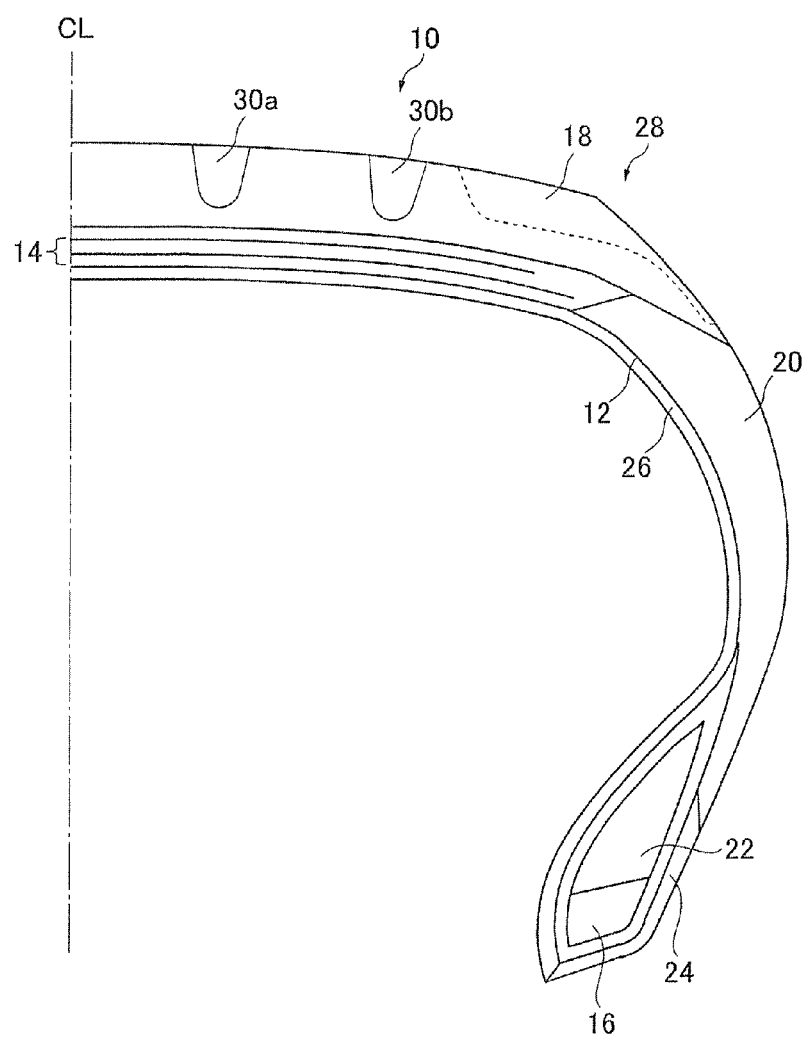
FIG. 1 is a cross sectional view of a pneumatic tire according to an embodiment.

A pneumatic tire according to the present invention will now be explained. FIG. 1 is a cross sectional view of a pneumatic tire (hereinafter also called "tire") 10 according to an embodiment. The pneumatic tire 10 is, for example, a tire for a passenger car. A passenger car tire is a tire defined according to Chapter A of the JATMA Yearbook 2009 (standards of The Japan Automobile Tyre Manufacturers Association, Inc.). The embodiment can also be applied to a small truck tire as defined in Chapter B of the same.

In the explanations that follow, a circumferential direction of a tire refers to a direction in which a tread surface rotates when the pneumatic tire 10 is rotated about a tire rotational axis, a radial direction of a tire is a direction extending perpendicularly to the tire rotational axis, and "outward in a radial direction" means away from the tire rotational axis along a radial direction of the tire. A widthwise direction of a tire means a direction parallel to the tire rotational axis, and "outward in a widthwise direction" of a tire means away from a tire centerline CL of the pneumatic tire 10 in either direction.

A groove explained later extends in a circumferential direction of the tire and has a groove width of 4 to 25 mm and a groove depth of at least 5 mm. A lug groove provided in a land section has a groove width of 1 to 5 mm and a groove depth of at least 1 mm. Also, a sub groove has a width of 0.5 to 1.5 mm and a depth of 0.5 to 5 mm.

The pneumatic tire 10 comprises chiefly a carcass ply material 12, belt members 14, and bead cores 16 serving as framework materials and a tread rubber member 18, side rubber members 20, bead filler rubber members 22, rim cushion rubber members 24, and an inner liner rubber member 26 arranged around the framework materials. The carcass ply material 12 is a member made of organic fibers covered with rubber. The organic fibers are wound between a pair of annular bead cores 16 in a toroidal form. Two belt members 14 are provided on a radially outward side of the carcass ply material 12. Each of the belt members 14 is made of steel cords that are arranged at a prescribed angle, e.g., 20 to 35 degrees, with respect to a circumferential direction of the tire and covered with rubber. The two belt members 14 are arranged layered over and under each other and the lower belt member 14 has a larger dimension in a widthwise direction of the tire than does the upper belt member 14. The steel cords of the two layered belts 14 are arranged in opposing diagonal directions. Thus, the belt members 14 form crisscrossed layers that suppress expansion of the carcass ply material 12 caused by the pressure of the air with which the tire is inflated.

The tread rubber member 18 is provided on the radially outward side of the belt members 14 and the side rubber members 20 are connected to the edge portions of the tread rubber member 18 to form side sections. The rim cushion members 24 are provided on radially inward edges of the side rubber members 20 and contact a wheel when the tire 10 is installed. The bead filler rubber members 22 are provided on radially outward sides of the bead cores 16 and each is arranged to be sandwiched between a portion of the carcass ply material 12 reached before the carcass ply material 12 winds around the respective bead core 16 and a portion of the carcass ply material 12 that has been wound around the bead core 16.

The inner liner rubber member 26 is provided on an inner surface of the tire 10 facing a hollow space region that is surrounded by the tire 10 and the wheel and serves as a space into which air is filled. Although the tire 10 of this embodiment has two belt members 14, it is acceptable to have three or more belt members layered on one another or to have a belt cover layer made of organic fibers layered over a belt member 14. Also, it is acceptable for the tire 10 to have two or more layers of carcass ply material 12 instead of just one layer.

Figure 2:
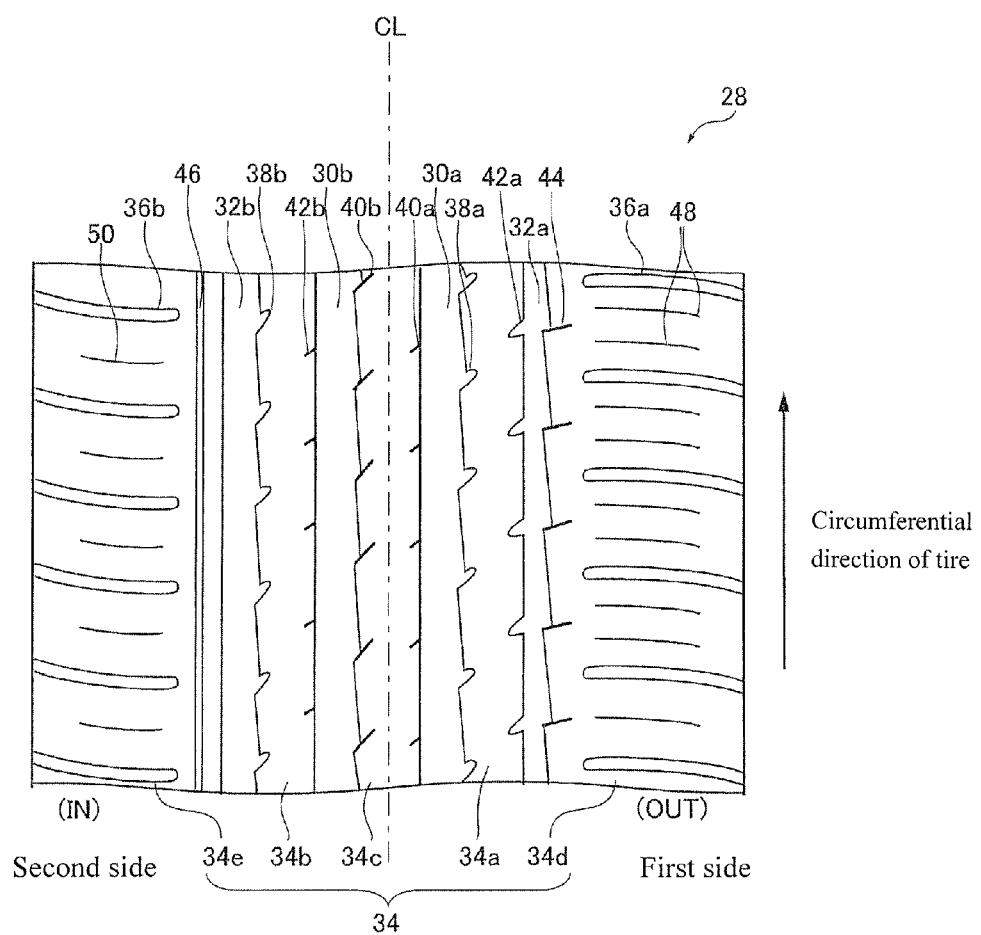
FIG. 2 is a flattened view showing a tread pattern of a tread section of the pneumatic tire shown in FIG. 1 spread out on a flat plane.

FIG. 2 is a flattened view showing a tread pattern of a tread section 28 of the tire 10 shown in FIG. 1 spread out in a flat plane. The tire 10 has an asymmetrical tread pattern specified such that when the tire is installed, the side section on the right side from the perspective of FIG. 2 (hereinafter called "first side") is arranged on an outward side of the vehicle and the side section on the left side from the perspective of FIG. 2 (hereinafter called "second side") is arranged on an inward side of the vehicle. Information regarding these specifications is indicated with a mark, a symbol, or lettering on, for example, a surface of a side portion of the tire 10.

The tread section 28 has center main grooves 30a and 30b, an outside main groove 32a, an inside main groove 32b, land sections 34a, 34b, 34c, 34d, and 34e, shoulder lug grooves 36a (outside shoulder lug grooves 36a) and 36b (inside shoulder lug grooves 36b), lug grooves 38a, 38b, and 42a, sipes 40a, 40b, 42b, 44, 48, and 50, and a sub groove 46. The center main grooves 30a and 30b are main grooves that extend in a circumferential direction of the tire and are arranged with a tire centerline CL in-between.

A tire-widthwise center of each of the two center main grooves is separated from the tire centerline by a distance equal to at least 8% and not more than 12% of a ground contact width (the widthwise direction of the tire is the direction perpendicular to the circumferential direction of the tire in FIG. 2). The outside main groove 32a is a main groove that extends in a circumferential direction of the tire and is provided on the first side of the center main grooves 30a and 30b in such a position that its center is separated from the tire centerline by a distance equal to at least 26% and not more than 32% of a ground contact width. The inside main groove 32b is a main groove that extends in a circumferential direction of the tire and is provided on the second side of the center main groove 30b in such a position that its center is separated from the tire centerline CL by a distance equal to at least 26% and not more than 32% of a ground contact width. The term "ground contact border" refers to the border portions of a ground contact surface separated from each other in a widthwise direction of the tire when the tire is installed on a standard rim compliant with JATMA specifications, filled to a JATMA specified air pressure, and loaded at 88% of a JATMA specified maximum load.

The land section 34a is an intermediate land section (outside intermediate land section) that extends continuously in a circumferential direction of the tire and is demarcated by the center main groove 30a and the outside main groove 32a. The land section 34b is an intermediate land section (inside intermediate land section) that extends continuously in a circumferential direction of the tire and is demarcated by the center main groove 30b and the inside main groove 32b. The land section 34c is a center land section that extends continuously in a circumferential direction of the tire and is demarcated by the center main groove 30a and the center main groove 30b. The land section 34d is an these specifications is indicated with a mark, a symbol, or lettering on, for example, a surface of a side portion of the tire 10.

The tread section 28 has center main grooves 30a and 30b, an outside main groove 32a, an inside main groove 32b, land sections 34a, 34b, 34c, 34d, and 34e, shoulder lug grooves 36a (outside shoulder lug grooves 36a) and 36b (inside shoulder lug grooves 36b), lug grooves 38a, 38b, and 42a, sipes 40a, 40b, 42b, 44, 48, and 50, and a sub groove 46. The center main grooves 30a and 30b are main grooves that extend in a circumferential direction of the tire and are arranged with a tire centerline CL in-between.

A tire-widthwise center of each of the two center main grooves is separated from the tire centerline by a distance equal to at least 8% and not more than 12% of a ground contact width (the widthwise direction of the tire is the direction perpendicular to the circumferential direction of the tire in FIG. 2). The outside main groove 32a is a main groove that extends in a circumferential direction of the tire and is provided on the first side of the center main grooves 30a and 30b in such a position that its center is separated from the tire centerline by a distance equal to at least 26% and not more than 32% of a ground contact width. The inside main groove 32b is a main groove that extends in a circumferential direction of the tire and is provided on the second side of the center main groove 30b in such a position that its center is separated from the tire centerline CL by a distance equal to at least 26% and not more than 32% of a ground contact width. The term "ground contact border" refers to the border portions of a ground contact surface separated from each other in a widthwise direction of the tire when the tire is installed on a standard rim compliant with JATMA specifications, filled to a JATMA specified air pressure, and loaded at 88% of a JATMA specified maximum load.

The land section 34a is an intermediate land section (outside intermediate land section) that extends continuously in a circumferential direction of the tire and is demarcated by the center main groove 30a and the outside main groove 32a. The land section 34b is an intermediate land section (inside intermediate land section) that extends continuously in a circumferential direction of the tire and is demarcated by the center main groove 30b and the inside main groove 32b. The land section 34c is a center land section that extends continuously in a circumferential direction of the tire and is demarcated by the center main groove 30a and the center main groove 30b. The land section 34d is an outside land section that extends in a circumferential direction of the tire and is demarcated by the outside main groove 32a and the first-side ground contact border. The land section 34e is an inside land section that extends in a circumferential direction of the tire and is demarcated by the inside main groove 32b and the second-side ground contact border.

The shoulder lug grooves 36a are provided in the land section 34d adjoining a shoulder edge on the first side, and the shoulder lug grooves 36b are provided in the land section 34e adjoining a shoulder edge on the second side. Each of the shoulder lug grooves 36a and 36b extends from a pattern end of a shoulder region of the tread section 28 and has a closed terminal end such that it does not communicate with the outside main groove 32a or the inside main groove 32b, respectively. That is, the shoulder lug grooves 36a do not connect to the outside main groove 32a, and the shoulder lug grooves 36b do not connect to the inside main groove 32b.

The lug grooves 38a extend into the land section 34a from the second-side edge of the land section 34a and are closed within the land section 34a, and the lug grooves 38b extend into the land section 34b from the second-side edge of the land section 34b and are closed within the land section 34b. The lug grooves 38a and 38b are slanted grooves that are slanted in the same direction with respect to the circumferential direction of the tire and separated at a prescribed spacing in the circumferential direction of the tire.

The sipes 40a extend into the land section 34c from the first-side edge of the land section 34c adjoining the center main groove 30a and are closed inside the land section 34c. The sipes 40a are separated from one another with a prescribed spacing in the circumferential direction of the tire. The sipes 40b extend into the land section 34c from the second-side edge of the land section 34c adjoining the center main groove 30b, are closed inside the land section 34c, are separated from one another with a prescribed spacing in the circumferential direction of the tire.

The lug grooves 42a are a plurality of slanted grooves that extend into the land section 34a from the first-side edge of the land section 34a, are closed inside the land section 34a, and are separated from one another with a prescribed spacing in the circumferential direction of the tire. The lug grooves 42a are a plurality of slanted grooves that extend into the land section 34a from the first-side edge of the land section 34a, are closed inside the land section 34a, and are separated from one another with a prescribed spacing in the circumferential direction of the tire. The widths and lengths of the lug grooves 38a and 42a provided in the land section 34a and the widths and lengths of the lug grooves 38b and sipes 42b provided in the land section 34b are adjusted such that when each of the land sections 34a and 34b is divided in a widthwise direction of the tire by a centerline, a groove area ratio of a region on the second side of the centerline (=area of lug groove region/(area of lug groove region+area of second side of land section)) is higher than a groove area ratio of a region on the first side of the centerline (=area of lug groove region/(area of lug groove region+area of first side of land section)). The reason the groove area ratio is set to be higher on the second side of each of the land sections 34a and 34b is so that the water evacuation performance of the lug grooves and the traction are improved on the second side of the land section without decreasing the surface area of the first side of the land section, where a ground contact length elongates during cornering. As a result, the steering stability performance on wet road surfaces is improved without decreasing the steering stability performance on dry road surfaces.

Additionally, assuming Wmax is a maximum groove width among the center main grooves 30a and 30b and the inside main groove 32b and assuming Wout is a groove width of the outside main groove 32a, the ratio Wmax/Wout is at least 1.5 and not larger than 2.5. A groove area ratio Sin (=groove area on second side/(groove area on second side+surface area of land section on second side) of a region of a ground contact surface located on the second side of the tire centerline CL and a groove area ratio Sout (=groove area on first side/(groove area on first side+surface area of land section on first side) of a region of a ground contact surface located on the first side of the tire centerline are set such that a ratio Sin/Sout is at least 1.10 and smaller than 1.25, and a groove area ratio of the entire ground contact surface (=groove area of first and second sides/(groove area of first and second sides+surface area of land section on first and second sides) is at least 23% and not larger than 33%. With a tread pattern having these constituent features, the steering stability performance on both dry road surfaces and wet road surfaces can be improved, as will be demonstrated in a working example explained later. "Improving both" means that at least one of the steering stability performance on dry road surfaces and the steering stability performance on wet road surfaces can be maintained or improved while the other is improved.

Sipes 48 are provided in the land section 34d having the shoulder lug grooves 36a, and the sipes 50 are provided in land section 34e having the shoulder lug grooves 36b. The sipes 48 are arranged such that at least one sipe 48 exists between any two circumferentially adjacent shoulder lug grooves 36a, and the sipes 48 are oriented to be parallel to the shoulder lug grooves 36a. The sipes 48 do not connect to the outside main groove 32a. Sipes 50 are arranged such that one sipe 50 exists between any two circumferentially adjacent shoulder lug grooves 36b, and the sipes 50 are oriented to be parallel to the shoulder lug grooves 36b. The sipes 50 do not connect to the inside main groove 32b.

Sipes 44 are provided in the land section 34d such that they extend toward the ground contact border from an edge of the land section 34d that adjoins the outside main groove 32a. The sipes 44 do not reach the ground contact border and close at positions separated from the edge adjoining the outside main groove 32a by a distance equal to at least 10% and not larger than 20% of a width of the land section 34d in a widthwise direction of the tire. Although the sipes 44 are provided in the land section 34d disposed on the first side of the tire in this embodiment, sipes 44 can also be provided in the land section 34e disposed on the second side of the tire. The sipes 44 adjust a tread rigidity of the land section 34d and improve the steering stability performance on dry road surfaces.

Figure 3:
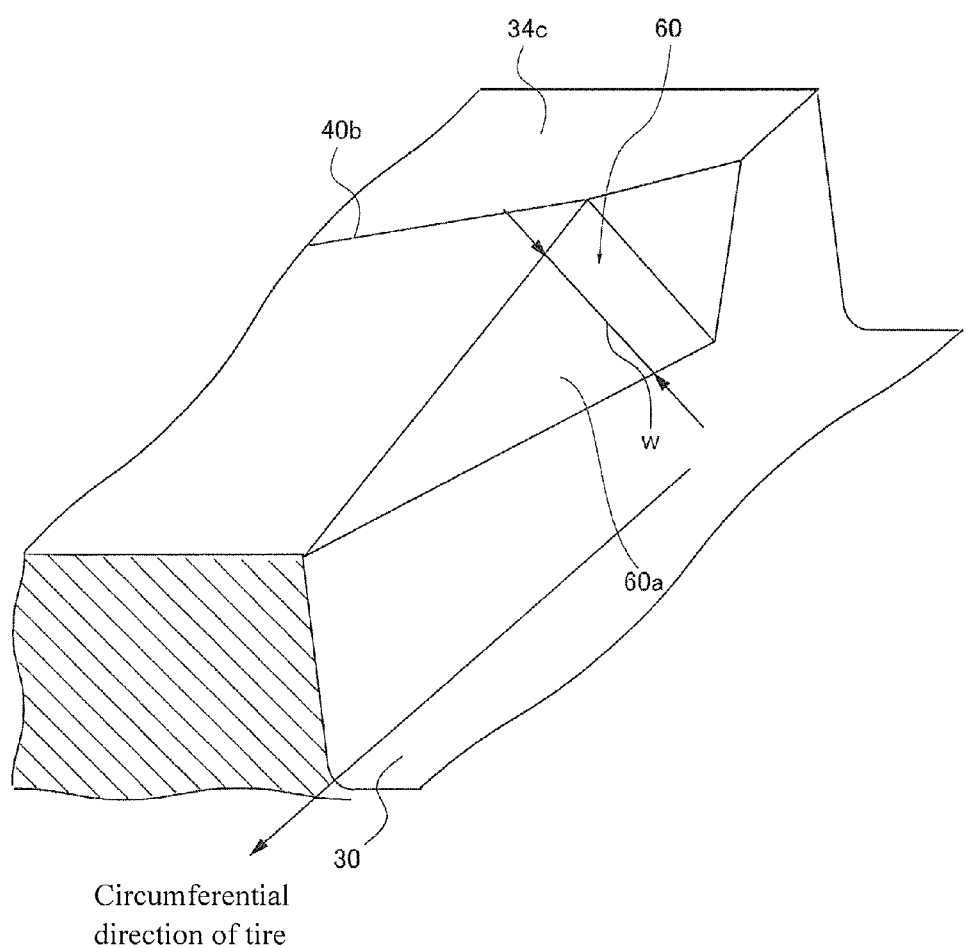
FIG. 3 shows an example of a chamfer formed on a tire according to the embodiment.

Chamfers 60 are formed on the second-side edges of the land sections 34a, 34b, 34c, and 34d, i.e., the edges where the lug grooves 38a and 38b and the sipes 40b and 44 form acute angles with the center main groove 30a, the inside main groove 32b, the center main groove 30b, and the outside main groove 32a, respectively. A chamfer width of the chamfer 60 varies monotonically along a circumferential direction of the tire. FIG. 3 shows a chamfer 60 provided on the edge of the land section 34c that adjoins the center main groove 30b. The chamfers provided on the second-side edges of the land sections 34a, 34b, and 34d are the same as the chamfer 60. The chamfer 60 is formed along the circumferential direction of the tire from a starting end where the sipe 40b connects to the center main groove 30b at an acute angle. As shown in FIG. 3, the chamfer 60 is configured such that the chamfer width w increases monotonically along the tire circumferential direction and then decreases and the chamfer surface 60a has a triangular shape. By providing the chamfer 60 thus configured, an edge component of the tread section 28 is increased and, thus, the steering stability performance on wet road surfaces improves. Although in this embodiment the chamfers 60 are provided on the second-side edges of the land sections 34a, 34b, 34c, and 34d, the invention is not limited to such an arrangement and it is acceptable to provide chamfers 60 on the second-side edge of at least one of the land sections 34a, 34b, 34c, and 34d. It is also acceptable not to provide any chamfers 60.

The sub groove 46 is provided between the shoulder lug groove 36b and the inside main groove 32b. The sub groove 46 serves to improve the steering stability performance on wet road surfaces. More specifically, the region on the second side of the tire centerline CL contributes little to the steering stability performance on dry road surfaces. The groove area ratio of this region is made large to increase the water evacuation performance such that the steering stability performance on wet road surfaces can be improved while maintaining the steering stability performance on dry road surfaces.

In the tread pattern explained heretofore, it is preferable for the lengths of the lug grooves 38a to be at least 20% and smaller than 50% of the width of the land section 34a and for the lengths of the lug grooves 38b to be at least 20% and smaller than 50% of the width of the land section 34b from the standpoint of improving the steering stability performance on dry road surfaces and wet road surfaces. If the lengths of the lug grooves 38a and 38b are shorter than the aforementioned range, then the steering stability performance on wet road surfaces will decline. Conversely, if the lengths of the lug grooves 38a and 38b are longer than the aforementioned range, then the steering stability performance on dry road surfaces will decline.

The positions of the terminal ends where the sipes 40a close are preferably separated from the first-side edge by a distance of at least 10% and not more than 30% of the width of the land section 34c. If the length of the sipes 40a is longer than this range, then the steering stability performance on dry road surfaces will decline. If the length of the sipes 40a is shorter than this range, then the riding comfort performance will decline and noise will increase. The positions of the terminal ends where the sipes 40b close are preferably separated from the second-side edge by a distance of at least 20% and less than 50% of the width of the land section 34c. If the positions of the terminal ends where the sipes 40b close are separated from the second-side edge by a distance smaller than 20% of the width of the land section 34c, then the riding comfort performance will decline and noise will increase. If the positions of the terminal ends where the sipes 40b close are separated from the second-side edge by a distance equal to or larger than 50% of the width of the land section 34c, then the steering stability performance on dry road surfaces will decline. The positions of the terminal ends where the lug grooves 42a close are preferably separated from the first-side edge of the land section 34a by a distance of at least 15% and not more than 35% of the width of the land section 34a. The positions of the terminal ends where the sipes 42b close are preferably separated from the first-side edge of the land section 34b by a distance of at least 15% and not more than 35% of the width of the land section 34b. If the terminal ends of the lug grooves 42a and the sipes 42b are positioned farther toward the second-side edge than the aforementioned ranges, then the steering stability performance on dry road surfaces will decline. Meanwhile, if the terminal ends of the lug grooves 42a and the sipes 42b are positioned closer to the first-side edge than the aforementioned ranges, then the steering stability performance on wet road surfaces and the riding comfort performance will decline and noise will increase.

It is preferable for the sipes 48 to close at positions separated from the edge of the land section 34d that adjoins the outside main groove 32a by a distance of at least 10% and not more than 20% of a width of the land section 34d in a widthwise direction of the tire and for the sipes 50 to close at positions separated from the edge of the land section 34e that adjoins the inside main groove 32b by a distance of at least 10% and not more than 20% of a width of the land section 34e in a widthwise direction of the tire (where the widths of the land section 34d and the land section 34e are the distances from the respective groove-adjoining edges to the respective ground contact borders). If the positions where the sipes 48 and 50 close are located at a distance smaller than 10% of the width of the land section 34 and the land section 34e, respectively, in a widthwise direction of the tire, then the tread rigidity will be excessively hard. Conversely, if the distance is larger than 20% of the land section width, then the tread rigidity will be excessively soft and the steering stability performance on dry road surfaces and wet road surfaces will decline.

It is preferable for the sipes 40a, 40b, and 42b to have an average slant angle of 40 to 90 degrees with respect to the circumferential direction of the tire and for the lug grooves 38a, 38b, and 42a to have an average slant angle of 40 to 65 degrees with respect to the circumferential direction of the tire. The average slant angle is the angle with respect to the circumferential direction of the tire made by a straight line drawn between a center of a starting end and a center of a terminal end of the sipe or lug groove. If the average slant angles of the sipes and lug grooves are smaller than 40 degrees, then the occurrence of chipping wear in which the tread rubber chips off and becomes worn along the peripheries of the sipes and lug grooves will be more likely to occur. If the average slant angles of the lug grooves exceed 65 degrees, then the steering stability performance on wet roads will decline.

The starting end of each of the lug grooves 38a extending from the second-side edge of the land section 34a is positioned within one pitch span between two adjacent lug grooves 42a extending from the first-side edge, and the starting end of each of the lug grooves 38b extending from the second-side edge of the land section 34b is positioned within one pitch span between two adjacent sipes 42b extending from the first-side edge. Moreover, it is preferable for the starting ends to be positioned at a distance equal to or smaller than 30% of the length of the pitch span from a center position of the pitch span along the circumferential direction of the tire. In this way, by adjusting the arrangements of the lug grooves 42a and the sipes on the first side and the lug grooves 38a and 38b on the second side, the tread rigidities of the land sections 34a and 34b can be made approximately uniform along the circumferential direction of the tire, an uneven wear performance can be improved, and noise can be reduced.

The tire widthwise positions of the terminal ends of the shoulder lug grooves 36a that are closer to the outside main groove 32a are preferably separated from the edge of the land section 34d that adjoins the outside main groove 32a by a distance of at least 10% and not more than 30% of a width of the land section 34d, and the tire widthwise positions of the terminal ends of the shoulder lug grooves 36b that are closer to the inside main groove 32b are preferably separated from the edge of the land section 34e that adjoins the inside main groove 32b by a distance of at least 10% and not more than 30% of a width of the land section 34e (where the widths are the distances from the edges of the outside main groove 32a and the inside main groove 32b to the respective ground contact borders). If the tire widthwise positions of the terminal ends of the shoulder lug grooves 36a and 36b that are closer to the outside main groove 32a and the inside main groove 32b, respectively, are positioned closer to the outside main groove 32a and the inside main groove 32b than the aforementioned range, then the tread rigidity of the land sections 34d and 34e will decline and the steering stability performance on dry road surfaces will decline. If the tire widthwise positions of the terminal ends of the shoulder lug grooves 36a and 36b that are closer to the outside main groove 32a and the inside main groove 32b, respectively, are positioned farther to the outside in the widthwise direction of the vehicle than the aforementioned range, then the steering stability performance of the land sections 34d and 34e on wet road surfaces will decline. It is preferable for an average slant angle of the shoulder lug grooves 36a and 36b with respect to the widthwise direction of the tire to be equal to or larger than 0 degree and smaller than or equal to 20 degrees. If the average slant angle exceeds 20 degrees, then noise will increase.

It is preferable for pitch lengths of the pitch spans in a region on the first side of the tire centerline CL to be larger than pitch lengths of the pitch spans in a region on the second side of the tire centerline CL. In the tread pattern shown in FIG. 2, it is discernable that the pitch lengths on the first side are slightly longer than the pitch lengths on the second side. The reason the pitch lengths are made longer on the first side is that lengthening the pitch lengths enables the tread rigidity to be increased on the first side and, thus, the steering stability performance on dry roads to be increased.

Figure 4:
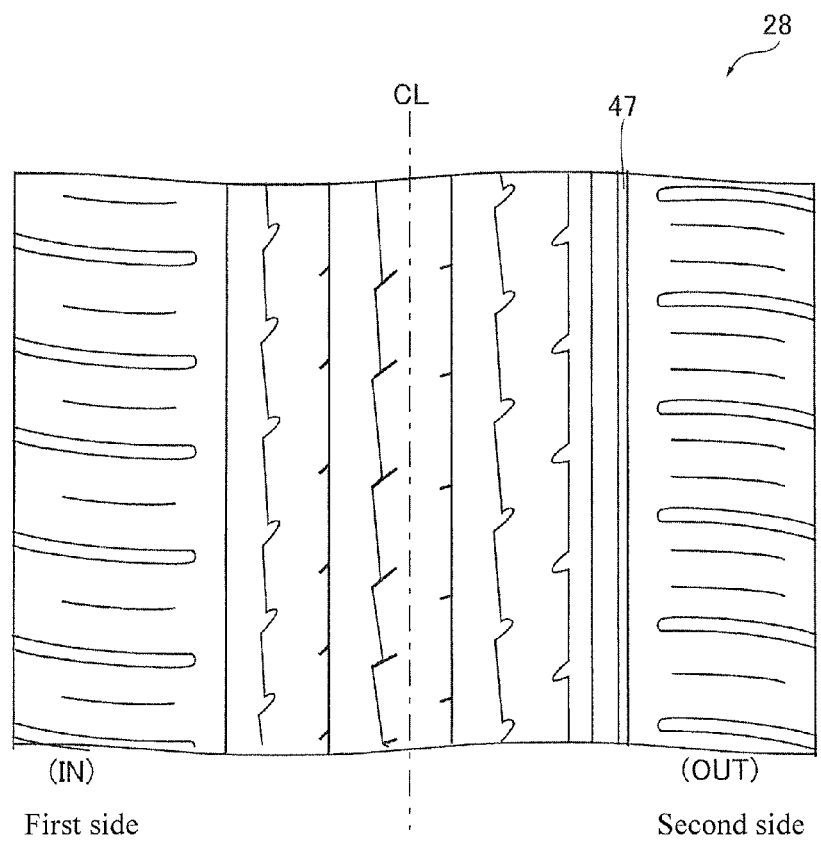
FIG. 4 shows another embodiment in the same view as FIG. 2.

FIG. 4 shows another embodiment in the same view as FIG. 2. In the example shown in FIG. 4, the tread pattern is the same as the example shown in FIG. 2 except that a sub groove 47 is provided on the second side. In this way, the sub groove 47 can be provided on the second side. With this configuration, too, the steering stability performance on dry road surfaces and wet road surfaces can be improved.

WORKING EXAMPLES

In order to investigate the effects of a pneumatic tire according to the present invention, pneumatic tires having the same tire structure and tire cross sectional profile were fabricated with various tread patterns and installed onto a vehicle to evaluate steering stability performance on dry road surfaces ("dry steering stability performance"), steering stability performance on wet road surfaces ("wet steering stability performance"), riding comfort performance, wear resistance performance, and noise ("noise performance"). The tire size of the pneumatic tire fabricated was 245/50R18, and the rim size of the rim used was 18×8J. The air pressure of the pneumatic tire was set 240 kPa and the tire was installed on a vehicle having an engine displacement of 3.5 liters.

The dry steering stability performance was evaluated sensorily by a test driver driving from 0 to 250 km/hour on a test course having a dry road surface. The evaluation results were expressed as index scores such that a conventional example explained later would be evaluated at a score of 100. The higher the index value is, the better the evaluation result indicated is. The wet steering stability performance was evaluated sensorily by a test driver driving from 0 to 100 km/hour on a test course having a wet road surface with a water depth of 1 to 2 mm. The evaluation results were converted into an index score such that a conventional tire explained later would be evaluated at a score of 100. The higher the index value is, the better the evaluation result indicated is.

The riding comfort performance was evaluated sensorily by a test driver driving 0 to 60 km/hour on a test course having a dry road surface. The riding comfort performance evaluation was conducted using a 5-point method with the conventional example explained later scored at 3 points as a reference. The higher the evaluation value is, the better the evaluation result indicated is. The wear resistance performance was evaluated by visually observing an uneven wear state produced on the tread surface after driving through a 5-km test course having a dry road surface ten times at 80 km/hour. The evaluation was conducted using a 5-point test method with the conventional example explained later scored at 3 points as a reference. The higher the evaluation value is, the better the evaluation result indicated is. The noise performance was evaluated sensorily by a test driver driving 60 km/hour on a test course having a dry road surface. The noise performance evaluation was conducted using a 5-point method with the conventional example explained later scored at 3 points as a reference. The higher the evaluation value is, the better the evaluation result indicated is.

The conventional example as basically the same tread pattern as the tread pattern disclosed in Japanese Laid-open Patent Application Publication No. 2010-215221. In contrast to the tread pattern of the embodiment shown in FIG. 2, the conventional tread pattern has shoulder lug grooves 36a that connect to the outside main groove 32a, does not have sipes 40a and 42b provided on the land sections 34c and 34b, and does not have a sub groove 46. Otherwise, the two tread patterns are the same. Also, the sipes 40b of the land section 34c extend to the center line CL. Working examples 1 to 5 are variations of the tread pattern shown in FIG. 2 in which various changes have been made to the dimensions of the tread pattern. Comparative examples 1 to 3 have the same constituent features as the working example 1 except that the shoulder grooves 36a and 36b are configured such that at least the shoulder grooves 36a or the shoulder grooves 36b are connected to the outside main groove 32a or the inside main groove 32b, respectively. Specifications for the conventional example, the working examples 1 to 5, and the comparative examples 1 to 3 are shown in Table 1 below. Evaluation results for the conventional example, the working examples 1 to 5, and the comparative examples 1 to 3 are also shown in Table 1 below. The tread patterns of the comparative examples are shown in FIG. 6 to 8.

TABLE 1

Figure 5:
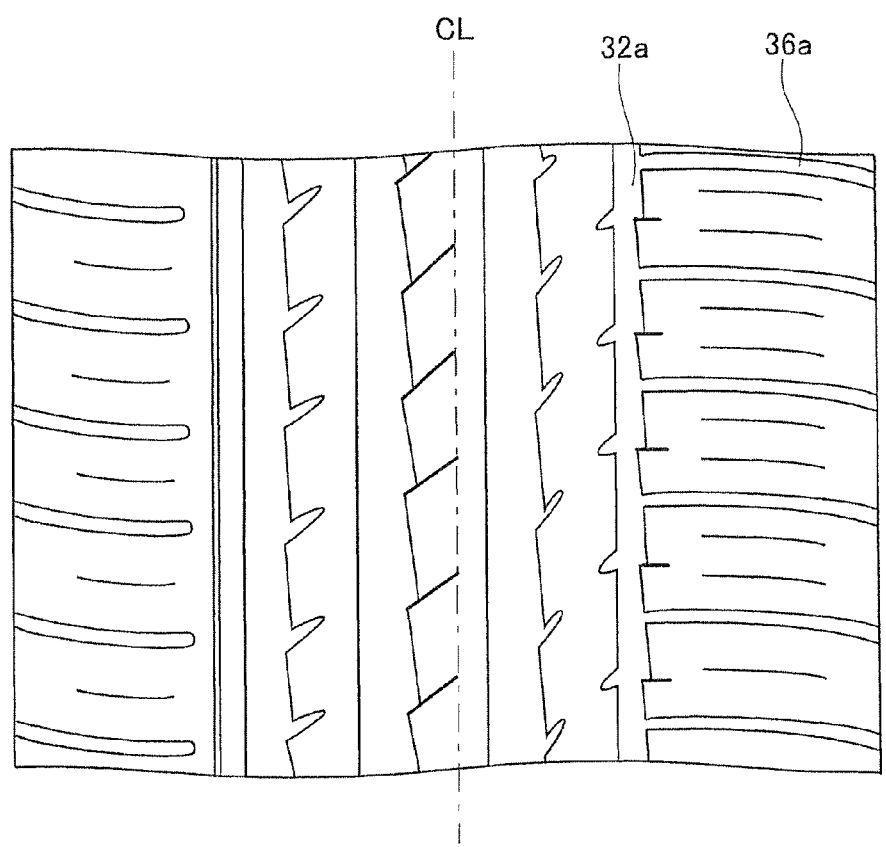
FIG. 5 shows a example of a conventional tread pattern.
Figure 6:
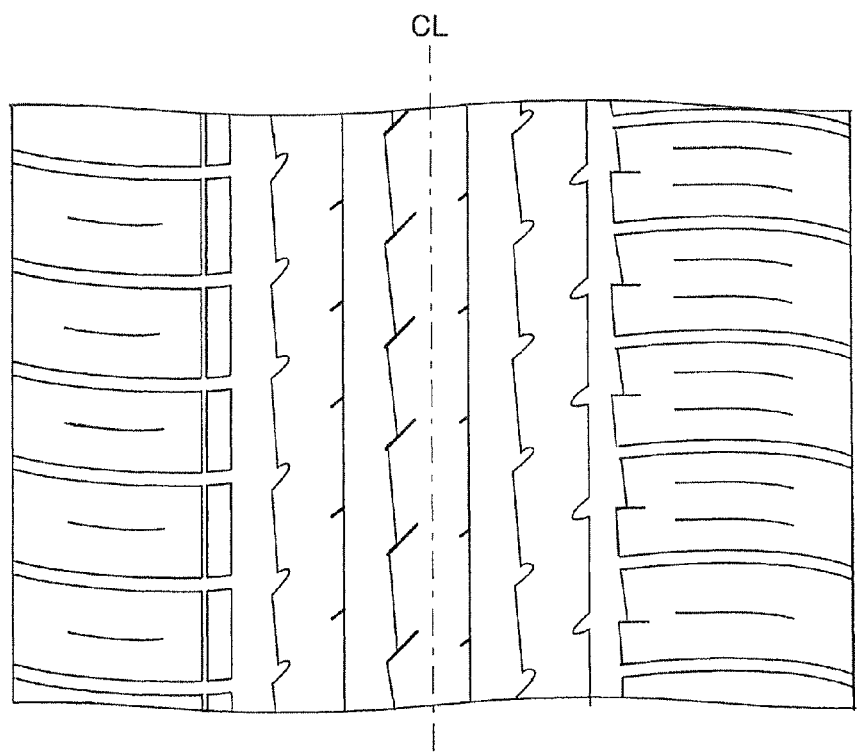
FIG. 6 shows a tread pattern according to a comparative example.
Figure 7:
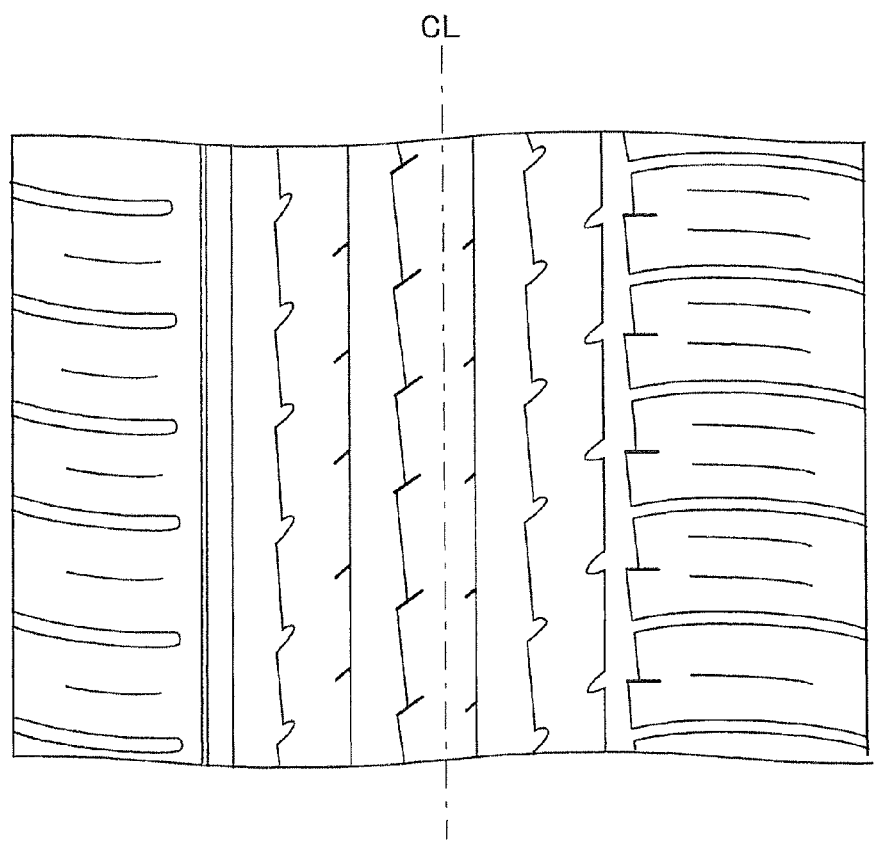
FIG. 7 shows a tread pattern according to another comparative example.
Figure 8:
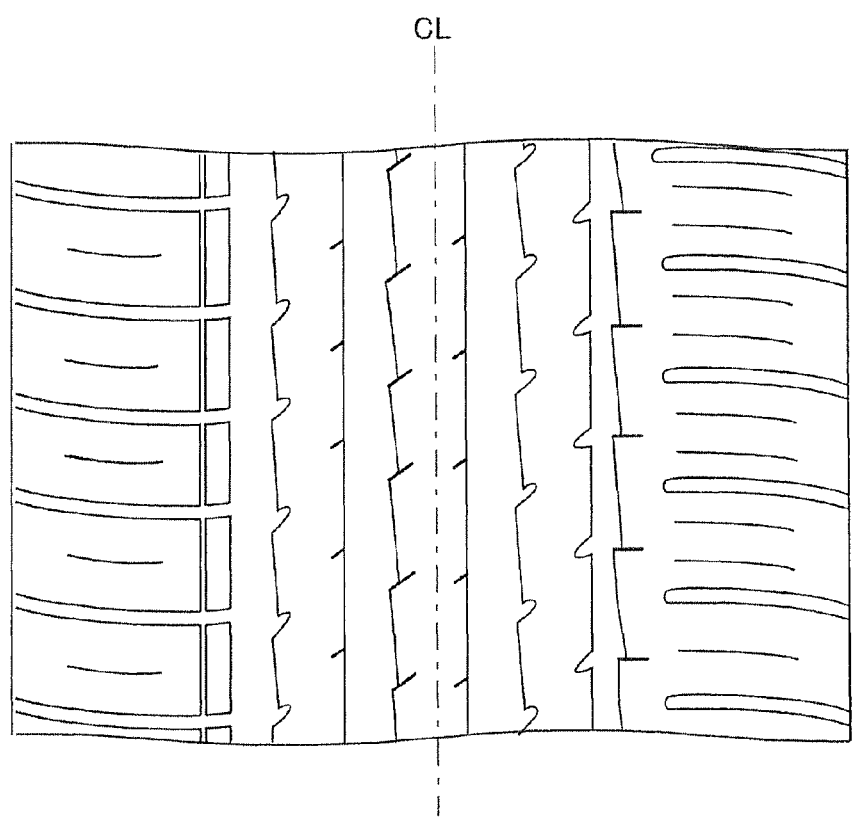
FIG. 8 shows a tread pattern according to still another comparative example.

| | Conventional Example | Working Example 1 | Working Example 2 | Working Example 3 | Working Example 4 | Working Example 5 | Comparative Example 1 | Comparative Example 2 | Comparative Example 3 |
|---|---|---|---|---|---|---|---|---|---|
| Drawing showing pattern | FIG. 5 | FIG. 2 | FIG. 2 | FIG. 2 | FIG. 2 | FIG. 2 | FIG. 6 | FIG. 7 | FIG. 8 |
| Land section 34c sipe 40b terminal end position | 50% | 30% | ← | ← | ← | ← | ← | ← | ← |
| Land section 34c sipe 40a terminal end position | — | 15% | ← | ← | ← | ← | ← | ← | ← |
| Land section 34b sipe 38b terminal end position | 60% | 25% | ← | ← | ← | ← | ← | ← | ← |
| Land section 34b sipe 42b terminal end position | — | 15% | ← | ← | ← | ← | ← | ← | ← |
| Land section 34a sipe 38a terminal end position | 40% | 25% | ← | ← | ← | ← | ← | ← | ← |
| Land section 34a sipe 42a terminal end position | 30% | 25% | ← | ← | ← | ← | ← | ← | ← |
| Shoulder lug groove 36b starting position | 10% | 20% | 5% | 10% | 30% | 35% | — | 10% | — |
| Shoulder lug groove 36a starting position | — | 20% | 5% | 10% | 30% | 35% | — | — | 10% |
| Dry steering stability performance | 100 | 120 | 105 | 110 | 130 | 135 | 95 | 100 | 95 |
| Wet steering stability performance | 100 | 120 | 105 | 110 | 105 | 100 | 100 | 100 | 100 |
| Riding comfort performance | 3 | 5 | 5 | 5 | 5 | 5 | 5 | 5 | 4 |

TABLE 1-continued

|  | Conventional Example | Working Example 1 | Working Example 2 | Working Example 3 | Working Example 4 | Working Example 5 | Comparative Example 1 | Comparative Example 2 | Comparative Example 3 |
|---|---|---|---|---|---|---|---|---|---|
| Wear resistance performance | 3 | 5 | 5 | 5 | 5 | 5 | 2 | 3 | 2 |
| Noise performance | 3 | 5 | 5 | 5 | 5 | 5 | 2 | 3 | 2 |

Comparing the results for the working example 1 and the comparative examples 1 to 3 shown in Table 1 demonstrates that positioning the terminal ends of the shoulder lug grooves 36a and 36b in positions separated from the outside main groove 32a and the inside main groove 32b, respectively, i.e., closing the shoulder lug grooves 36a and 36b such that they do not communicate with the outside main groove 32a and 32b, enables both the dry steering stability performance and the wet steering stability performance to be improved. Meanwhile, as show in the working examples 2 to 5, the dry steering stability performance and the wet steering stability performance are both improved even if the end positions of the shoulder lug grooves 36a and 36b are varied.

Further working examples 6 to 14 of tread patterns were also fabricated and evaluated with respect to the performance characteristics explained above. The working examples 6 to 10 are variations of the tread pattern shown in FIG. 9 in which various changes have been made to the dimensions of the tread pattern. In the working examples 6, 8, and 9, the terminal end positions of the sipes 40b of the land section 34c, the terminal end positions of the sipes 42b of the land sections 34b, and the terminal end positions of the lug grooves 38a of the land separated from the respective edges by a distance of at least 20% and less than 50% of the width of the land section 34a, 34b, or 34c. Conversely, the working examples 7 and 10 do not satisfy this condition. The working examples 11 to 14 are variations of the tread pattern shown in FIG. 2 in which various changes have been made to the dimensions of the tread pattern. In the working examples 12 and 13, the terminal end positions of the sipes 40a of the land sections 34c are separated from the by a distance of at least 10% and not more than 30% of the width of the land section 34c and the terminal end positions of the lug grooves 42a of the land section 34a and the terminal end positions of the lug grooves 42b of the land section 34b are separated from the edge by a distance of at least 15% and not more than 35% of the width of the respective land section 34a or 34b. Conversely, the working examples 11 and 14 do not satisfy these conditions. Specifications of the working examples 6 to 14 are shown in Table 2 below. Evaluation results of the working examples 6 to 14 are also shown in Table 2 below.

TABLE 2

Figure 9:
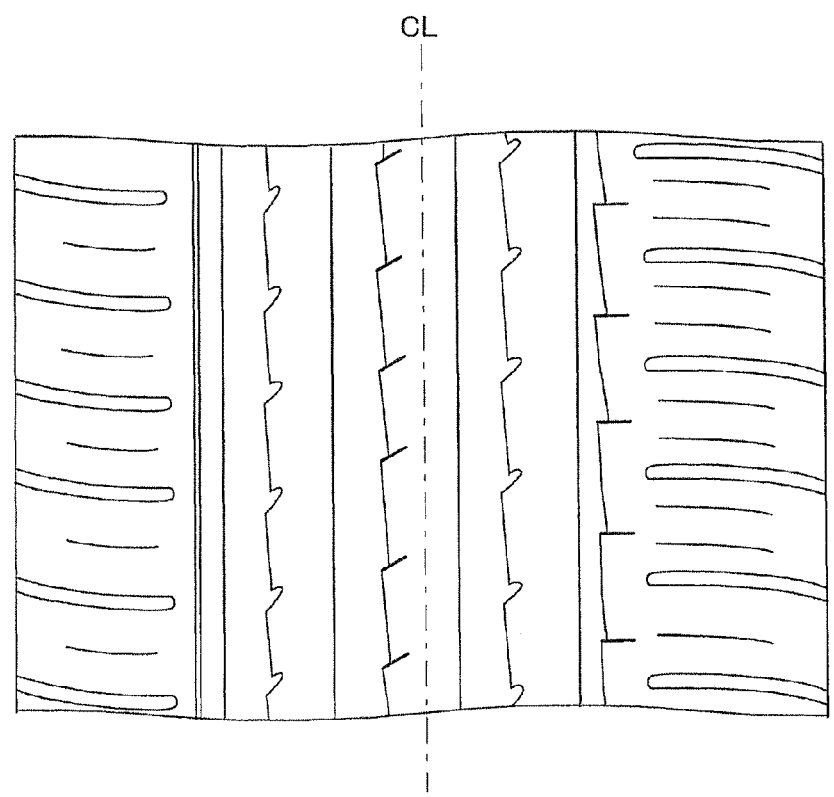
FIG. 9 shows a tread pattern according to a working example.

|  | Working Example 6 | Working Example 7 | Working Example 8 | Working Example 9 | Working Example 10 | Working Example 11 | Working Example 12 | Working Example 13 | Working Example 14 |
|---|---|---|---|---|---|---|---|---|---|
| Drawing showing pattern | FIG. 9 | FIG. 9 | FIG. 9 | FIG. 9 | FIG. 9 | FIG. 2 | FIG. 2 | FIG. 2 | FIG. 2 |
| Land section 34c sipe 40b terminal end position | 30% | 15% | 20% | 45% | 50% | 45% | ← | ← | ← |
| Land section 34c sipe 40a terminal end position | — | — | — | — | — | 5% | 10% | 30% | 35% |
| Land section 34b sipe 38b terminal end position | 25% | 15% | 20% | 45% | 50% | 45% | ← | ← | ← |
| Land section 34b sipe 42b terminal end position | — | — | — | — | — | 10% | 15% | 35% | 40% |
| Land section 34a sipe 38a terminal end position | 25% | 15% | 20% | 45% | 50% | 45% | ← | ← | ← |
| Land section 34a sipe 42a terminal end position | — | — | — | — | — | 10% | 15% | 35% | 40% |
| Shoulder lug groove 36b starting position | 20% | ← | ← | ← | ← | ← | ← | ← | ← |
| Shoulder lug groove 36a starting position | 20% | ← | ← | ← | ← | ← | ← | ← | ← |
| Dry steering stability performance | 125 | 135 | 130 | 115 | 110 | 115 | 110 | 105 | 100 |
| Wet steering stability performance | 105 | 100 | 105 | 110 | 110 | 110 | 115 | 120 | 125 |
| Riding comfort performance | 4 | 3 | 3 | 4 | 4 | 4 | 5 | 5 | 5 |
| Wear resistance performance | 5 | 5 | 5 | 5 | 5 | 5 | 5 | 5 | 5 |
| Noise performance | 4 | 3 | 3 | 4 | 4 | 4 | 4 | 5 | 4 |

Comparing the working examples 6 to 10 demonstrates that it is preferable for the terminal end positions of the sipes 40b of the land section 34c, the terminal end positions of the lug grooves 38b of the land sections 34b, and the terminal end positions of the lug grooves 38a of the land sections 34a satisfy the conditions of being separated from the respective examples 15 to 20 are shown in Table 3 below. Evaluation results of the working examples 15 to 20 are also shown in Table 3 below.

TABLE 3

|  | Working Example 1 | Working Example 15 | Working Example 16 | Working Example 17 | Working Example 18 | Working Example 19 | Working Example 20 |
|---|---|---|---|---|---|---|---|
| Drawing showing pattern | FIG. 2 | FIG. 2 | FIG. 2 | FIG. 2 | FIG. 2 | FIG. 2 | FIG. 2 |
| Average slant angle of sipes 40a and 40b | 50 deg | 35 deg | 50 deg | ← | ← | ← | ← |
| Average slant angle of lug grooves 38a, 38b, 42a and sipes 42b | 45 deg | ← | 30 deg | 70 deg | 45 deg | ← | ← |
| Average slant angle of shoulder lug grooves 36a and 36b | 5 deg | ← | ← | ← | 25 deg | 5 deg | ← |
| Shoulder sipe 44 provided? (Y/N) | Yes | ← | ← | ← | ← | No | Yes |
| Chamfer 60 provided? (Y/N) | Yes | ← | ← | ← | ← | ← | No |
| Dry steering stability performance | 120 | 120 | 120 | 120 | 120 | 120 | 120 |
| Wet steering stability performance | 120 | 120 | 120 | 115 | 120 | 120 | 105 |
| Riding comfort performance | 5 | 5 | 5 | 5 | 5 | 4 | 5 |
| Wear resistance performance | 5 | 4 | 4 | 4 | 5 | 5 | 5 |
| Noise performance | 5 | 5 | 5 | 5 | 3 | 4 | 5 | edges by a distance of at least 20% and less than 50% of the width of the land section 34a, 34b, or 34c. When the terminal positions are within this range, the dry steering stability performance can be raised to an index score of at least 115 compared to the conventional example and the wet steering stability performance can be raised to an index score of at least 105 compared to the conventional example. Comparing the working examples 11 to 14 demonstrates that it is preferable for the terminal end positions of the not more than 30% of the width of land section 34c, the terminal end positions of the sipes 42b of the land sections 34b to be separated from the edge by a distance of at least 15% and not more than 35% of the width of the land section 34b, and the terminal end positions of at least 15% and not more than 35% of the width of the land section 34a. When the terminal positions are within these ranges, the dry steering stability performance can be raised to an index score of at least 105 compared to the conventional example and the wet steering stability performance can be raised to an index score of at least 105 compared to the conventional example.

Using the tread pattern of the working example 1 shown in Table 1 as a base pattern, tire patterns incorporating various changes to the dimensions of the shoulder lug grooves and other features were fabricated (working examples 15 to 20) and the aforementioned performance characteristics were evaluated. In the working example 15, the average slant angles of the sipes 40a and 40b have been changed with respect to the working example 1. In the working examples 16 and 17, the average slant angles of the lug grooves 38a, 38b, 42a, 42b have been changed with respect to the working example 1. In the working example 18, the average slant angles of the shoulder lug grooves 36a and 36b have been changed with respect to the working example 1. In the working example 19, the sipes 44 of the working example 1 are omitted. In the working example 20, the chamfering 60 of the working example 1 are omitted. Specifications of the working As shown in Table 3, similarly to the working example 1, the working examples 15 to 20 can improve both the dry steering stability performance and the wet steering stability performance. Thus, in this embodiment, the tire-widthwise centers of the center main grooves 30a and 30b are separated from the tire centerline CL by a distance equal to at least 8% and not larger than 12% of the ground contact width and the tire-widthwise centers of the outside main groove 32a and the inside main groove 32b are separated from the tire centerline CL by a distance equal to at least 26% and not larger than 32% of the ground contact width. Additionally, assuming Wmax is a maximum groove width among the center main grooves 30a and 30b and the inside main groove 32b and assuming Wout is a groove width of the outside main groove 32a, the ratio Wmax/Wout is at least 1.5 and not larger than 2.5. The groove area ratio Sin of the region of the ground contact surface located on the second side of the tire centerline CL and the groove area ratio Sout of the region of the ground contact surface located on the first side of the tire centerline CL are set such that the ratio Sin/Sout is at least 1.10 and smaller than 1.25, and the groove area ratio of the entire ground contact surface is at least 23% and not larger than 33%. The lug grooves and sipes are provided in the land sections 34a and 34b such that the groove area ratio of the region on the second side of a tire-widthwise centerline CL of each of the land sections 34a and 34b is higher than the groove area ratio of the region on the first side of the centerline. By configuring such a tread pattern such that the shoulder lug grooves 36a and 36b have closed terminal ends and do not communicate with the inside main groove 32b and the outside main groove 32a, a tire according to this embodiment can improve both the steering stability performance on dry road surfaces and the steering stability performance on wet road surfaces. Moreover, a tire according to this embodiment is not inferior to the conventional example regarding riding comfort performance, wear resistance performance, and noise performance. The effects of a pneumatic tire according to the present invention should be obvious based on the preceding explanations.

Although a pneumatic tire according to the present invention has been explained in detail, the present invention is not limited to the previously explained embodiment and various improvements and modifications can clearly be made without departing from the scope of the invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
   a first side side-section arranged on an outward side when the tire is mounted to a vehicle, a second side side-section arranged on an inward side when the tire is mounted to a vehicle, and a tread section, the tread section comprising:
      a plurality of circumferential main grooves extending along a circumferential direction of the tire, the plurality of circumferential main grooves including the following four main grooves:
         two center main grooves provided on opposite sides of a tire centerline and arranged such that a tire-widthwise center of each of the two center main grooves is separated from the tire centerline by a distance equal to at least 8% and not more than 12% of a ground contact width;
         an inside main groove provided on the second side with respect to the center main grooves and arranged such that a tire-widthwise center of the inside main groove is separated from the tire centerline by a distance equal to at least 26% and not more than 32% of the ground contact width; and
         an outside main groove provided on the first side with respect to the center main grooves and arranged such that a tire-widthwise center of the outside main groove is separated from the tire centerline by a distance equal to at least 26% and not more than 32% of the ground contact width;
      a plurality of land sections that are demarcated by the circumferential main grooves and ground contact borders on both sides of the tread section and extending continuously in the circumferential direction of the tire, such that an inside land section of the land sections that is positioned on the second side with respect to the inside main groove defines an inside shoulder lug groove that extends in a widthwise direction of the tire and an outside land section of the land sections that is positioned on the first side with respect to the outside main groove defines an outside shoulder lug groove that extends in the widthwise direction of the tire;
   Wmax is a maximum groove width among the center main grooves and the inside main groove and Wout is a groove width of the outside main groove, such that a ratio Wmax/Wout is at least 1.5 and not larger than 2.5;
   a groove area ratio Sin of a region of a ground contact surface located on the second side of the tire centerline and a groove area ratio Sout of a region of the ground contact surface located on the first side of the tire centerline are set such that a ratio Sin/Sout is at least 1.10 and smaller than 1.25, and a groove area ratio of the entire ground contact surface is at least 23% and not larger than 33%;
   the land sections include an inside intermediate land section demarcated by the inside main groove and the center main groove positioned on the second side of the tire centerline and an outside intermediate land section demarcated by the outside main groove and the center main groove positioned on the first side of the tire centerline, each of the inside and outside intermediate land sections being provided with a plurality of slanted grooves or sipes, such that a groove area ratio of a region on the second side of a first centerline dividing the inside intermediate land section in the widthwise direction of the tire is higher than a groove area ratio of a region on the first side of the first centerline, and a groove area ratio of a region on the second side of a second centerline dividing the outside intermediate land section in the widthwise direction of the tire is higher than a groove area ratio of a region on the first side of the second centerline; and
   the inside shoulder lug groove has a terminal end that is closed such that the inside shoulder lug groove does not communicate with the inside main groove, and the outside shoulder lug groove has a terminal end that is closed such that the outside shoulder lug groove does not communicate with the outside main groove and wherein sipes are provided on a first side edge of the inside intermediate land section facing toward the first side and sipes are not provided on a second side edge of the inside intermediate land section facing toward the second side.

2. The pneumatic tire according to claim 1, wherein
   the land sections include a center land section demarcated by the center main grooves, the center land section being provided with sipes that extend into the center land section from a second side edge of the center land section adjoining the center main groove on the second side, the sipes being closed within the center land section and separated from one another with a prescribed spacing in the circumferential direction of the tire;
   the slanted grooves in the inside intermediate land section extend into the inside intermediate land section from a second side edge of the inside intermediate land section located on the second side, the slanted grooves being closed within the inside intermediate land sections and separated from one another with a prescribed spacing in the circumferential direction of the tire; and
   the slanted grooves in the outside intermediate land section extend into the outside intermediate land section from a second side edge of the outside intermediate land section located on the second side, the slanted grooves being closed within the outside intermediate land sections and separated from one another with a prescribed spacing in the circumferential direction of the tire.

3. The pneumatic tire according to claim 2, wherein
positions of terminal ends where the sipes provided in the center land section close are separated from the second side edge of the center land section by a distance equal to at least 20% and smaller than 50% of a width of the center land section; and
positions of terminal ends where the slanted grooves provided in the inside and outside intermediate land sections close are separated from the second side edge of their respective inside and outside intermediate land section by a distance equal to at least 20% and smaller than 50% of a width of their respective inside and outside intermediate land section.

4. The pneumatic tire according to claim 3, wherein
each of the sipes has an average slant angle of at least 40 degrees and not larger than 90 degrees with respect to the circumferential direction of the tire and each of the slanted grooves has an average slant angle of at least 40 degrees and not larger than 65 degrees with respect to the circumferential direction of the tire.

5. The pneumatic tire according to claim 2, wherein
the land sections include a center land section demarcated by the center main grooves, the center land section including sipes that extend into the center land section from a first side edge of the center land section adjoining the center main groove on the first side, the sipes being closed within the center land section and separated from one another with a prescribed spacing in the circumferential direction of the tire;
the sipes or slanted grooves that extend into the inside intermediate land section from a first side edge of the inside intermediate land section located on the first side are closed within the inside intermediate land section and are separated from one another with a prescribed spacing in the circumferential direction of the tire; and
the sipes or slanted grooves that extend into the outside intermediate land section from a first side edge of the outside intermediate land section located on the first side are closed within the outside intermediate land section and are separated from one another with a prescribed spacing in the circumferential direction of the tire.

6. The pneumatic tire according to claim 2, wherein
the inside land section comprises inside shoulder lug grooves, the outside land section comprises outside shoulder lug grooves, and pitch lengths of a tread pattern that are defined by the slanted grooves or the sipes and the shoulder lug grooves in a region on the first side of the tire centerline CL are larger than pitch lengths of a tread pattern that are defined by the slanted grooves or the sipes and the shoulder lug grooves in a region on the second side of the tire centerline CL.

7. The pneumatic tire according to claim 2, wherein
the slanted grooves that extend into the inside intermediate land section from a second side edge of the inside intermediate land section located on the second side are closed within the inside intermediate land section and are separated from one another with a prescribed spacing in the circumferential direction of the tire;
the slanted grooves that extend into the outside intermediate land section from a second side edge of the outside intermediate land section located on the second side are closed within the outside intermediate land section and are separated from one another with a prescribed spacing in the circumferential direction of the tire;
the sipes or slanted grooves that extend into the inside intermediate land section from a first side edge of the inside intermediate land section located on the first side are closed within the inside intermediate land section and are separated from one another with a prescribed spacing in the circumferential direction of the tire;
the sipes or slanted grooves that extend into the outside intermediate land section from a first side edge of the outside intermediate land section located on the first side are closed within the outside intermediate land section and are separated from one another with a prescribed spacing in the circumferential direction of the tire; and
a starting end of each of the slanted grooves extending from the second side edge of each of the inside and outside intermediate land sections is positioned within one pitch span between two adjacent sipes or slanted grooves extending from the first side edge of the respective inside and outside intermediate land section, and the starting ends are positioned at a distance equal to or smaller than 30% of the length of the pitch span from a center position of the pitch span along the circumferential direction of the tire.

8. The pneumatic tire according to claim 2, wherein
a tire-widthwise position of the terminal end of the inside shoulder lug groove that is closer to the inside main groove is separated from an edge of the inside land section that adjoins the inside main groove by a distance of least 10% and not more than 30% of a width of the inside land section; and
a tire-widthwise position of the terminal end of the outside shoulder lug groove that is closer to the outside main groove is separated from an edge of the outside land section that adjoins the outside main groove by a distance of least 10% and not more than 30% of a width of the outside land section.

9. The pneumatic tire according to claim 2, wherein
each of the inside and outside shoulder lug grooves has an average slant angle of at least 0 degree and not larger than 20 degrees with respect to the widthwise direction of the tire.

10. The pneumatic tire according to claim 2, wherein
at least one of the inside land section and the outside land section includes sipes that extend from an edge adjoining the inside main groove or the outside main groove toward the ground contact border without reaching the ground contact border and close at positions separated from the edge adjoining the inside main groove or the outside main groove by a distance equal to at least 10% and not larger than 20% of a width of the inside land section or outside land section in the widthwise direction of the tire.

11. The pneumatic tire according to claim 2, wherein
each of the sipes has an average slant angle of at least 40 degrees and not larger than 90 degrees with respect to the circumferential direction of the tire and each of the slanted grooves has an average slant angle of at least 40 degrees and not larger than 65 degrees with respect to the circumferential direction of the tire.

12. The pneumatic tire according to claim 1, wherein
the land sections include a center land section demarcated by the center main grooves, the center land section including sipes that extend into the center land section from a first side edge of the center land section adjoining the center main groove on the first side, the sipes being closed within the center land section and separated from one another with a prescribed spacing in the circumferential direction of the tire;

the sipes or slanted grooves that extend into the inside intermediate land section from a first side edge of the inside intermediate land section located on the first side are closed within the inside intermediate land section and are separated from one another with a prescribed spacing in the circumferential direction of the tire; and the sipes or slanted grooves that extend into the outside intermediate land section from a first side edge of the outside intermediate land section located on the first side are closed within the outside intermediate land section and are separated from one another with a prescribed spacing in the circumferential direction of the tire.

13. The pneumatic tire according to claim 12, wherein
positions of terminal ends where the sipes provided in the center land section close are separated from the first side edge of the center land section by a distance equal to at least 10% and smaller than 30% of a width of the center land section;

positions of terminal ends where the sipes or the slanted grooves provided in the first side edge of the inside intermediate land section close are separated from the first side edge of the inside intermediate land section by a distance equal to at least 15% and smaller than 35% of a width of the inside intermediate land section; and positions of terminal ends where the sipes or the slanted grooves provided in the first side edge of the outside intermediate land section close are separated from the first side edge of the outside intermediate land section by a distance equal to at least 15% and smaller than 35% of a width of the outside intermediate land section.

14. The pneumatic tire according to claim 12, wherein
each of the sipes has an average slant angle of at least 40 degrees and not larger than 90 degrees with respect to the circumferential direction of the tire and each of the slanted grooves has an average slant angle of at least 40 degrees and not larger than 65 degrees with respect to the circumferential direction of the tire.

15. The pneumatic tire according to claim 1, wherein
the inside land section comprises inside shoulder lug grooves, the outside land section comprises outside shoulder lug grooves, and pitch lengths of a tread pattern that are defined by the slanted grooves or the sipes and the shoulder lug grooves in a region on the first side of the tire centerline CL are larger than pitch lengths of a tread pattern that are defined by the slanted grooves or the sipes and the shoulder lug grooves in a region on the second side of the tire centerline CL.

16. The pneumatic tire according to claim 1, wherein
the slanted grooves that extend into the inside intermediate land section from a second side edge of the inside intermediate land section located on the second side are closed within the inside intermediate land section and are separated from one another with a prescribed spacing in the circumferential direction of the tire;

the slanted grooves that extend into the outside intermediate land section from a second side edge of the outside intermediate land section located on the second side are closed within the outside intermediate land section and are separated from one another with a prescribed spacing in the circumferential direction of the tire;

the sipes or slanted grooves that extend into the inside intermediate land section from a first side edge of the inside intermediate land section located on the first side are closed within the inside intermediate land section and are separated from one another with a prescribed spacing in the circumferential direction of the tire;

the sipes or slanted grooves that extend into the outside intermediate land section from a first side edge of the outside intermediate land section located on the first side are closed within the outside intermediate land section and are separated from one another with a prescribed spacing in the circumferential direction of the tire; and a starting end of each of the slanted grooves extending from the second side edge of each of the inside and outside intermediate land sections is positioned within one pitch span between two adjacent sipes or slanted grooves extending from the first side edge of the respective inside and outside intermediate land section, and the starting ends are positioned at a distance equal to or smaller than 30% of the length of the pitch span from a center position of the pitch span along the circumferential direction of the tire.

17. The pneumatic tire according to claim 1, wherein
a tire-widthwise position of the terminal end of the inside shoulder lug groove that is closer to the inside main groove is separated from an edge of the inside land section that adjoins the inside main groove by a distance of least 10% and not more than 30% of a width of the inside land section; and a tire-widthwise position of the terminal end of the outside shoulder lug groove that is closer to the outside main groove is separated from an edge of the outside land section that adjoins the outside main groove by a distance of least 10% and not more than 30% of a width of the outside land section.

18. The pneumatic tire according to claim 1, wherein
each of the inside and outside shoulder lug grooves has an average slant angle of at least 0 degree and not larger than 20 degrees with respect to the widthwise direction of the tire.

19. The pneumatic tire according to claim 1, wherein
at least one of the inside land section and the outside land section includes sipes that extend from an edge adjoining the inside main groove or the outside main groove toward the ground contact border without reaching the ground contact border and close at positions separated from the edge adjoining the inside main groove or the outside main groove by a distance equal to at least 10% and not larger than 20% of a width of the inside land section or outside land section in the widthwise direction of the tire.

20. The pneumatic tire according to claim 1, wherein
one of the land sections includes slanted grooves or sipes in a second side edge adjoining one of the circumferential main grooves, and a chamfer formed in each region of the second side edge where one of the slanted grooves or sipes forms an acute angle with the one of the circumferential grooves, such that a width of the chamfer varies monotonically along the circumferential direction of the tire.

21. A pneumatic tire comprising:
a first side side-section arranged on an outward side when the tire is mounted to a vehicle, a second side side-section arranged on an inward side when the tire is mounted to a vehicle, and a tread section, the tread section comprising:
a plurality of circumferential main grooves extending along a circumferential direction of the tire, the plurality of circumferential main grooves including the following four main grooves:
two center main grooves provided on opposite sides of a tire centerline and arranged such that a tire-widthwise center of each of the two center main grooves is separated from the tire centerline by a distance equal to at least 8% and not more than 12% of a ground contact width;

an inside main groove provided on the second side with respect to the center main grooves and arranged such that a tire-widthwise center of the inside main groove is separated from the tire centerline by a distance equal to at least 26% and not more than 32% of the ground contact width; and an outside main groove provided on the first side with respect to the center main grooves and arranged such that a tire-widthwise center of the outside main groove is separated from the tire centerline by a distance equal to at least 26% and not more than 32% of the ground contact width;

a plurality of land sections that are demarcated by the circumferential main grooves and ground contact borders on both sides of the tread section and extending continuously in the circumferential direction of the tire, such that an inside land section of the land sections that is positioned on the second side with respect to the inside main groove defines an inside shoulder lug groove that extends in a widthwise direction of the tire and an outside land section of the land sections that is positioned on the first side with respect to the outside main groove defines an outside shoulder lug groove that extends in the widthwise direction of the tire;

Wmax is a maximum groove width among the center main grooves and the inside main groove and Wout is a groove width of the outside main groove, such that a ratio Wmax/Wout is at least 1.5 and not larger than 2.5;

a groove area ratio Sin of a region of a ground contact surface located on the second side of the tire centerline and a groove area ratio Sout of a region of the ground contact surface located on the first side of the tire centerline are set such that a ratio Sin/Sout is at least 1.10 and smaller than 1.25, and a groove area ratio of the entire ground contact surface is at least 23% and not larger than 33%;

the land sections include an inside intermediate land section demarcated by the inside main groove and the center main groove positioned on the second side of the tire centerline and an outside intermediate land section demarcated by the outside main groove and the center main groove positioned on the first side of the tire centerline, each of the inside and outside intermediate land sections being provided with a plurality of slanted grooves or sipes, such that a groove area ratio of a region on the second side of a first centerline dividing the inside intermediate land section in the widthwise direction of the tire is higher than a groove area ratio of a region on the first side of the first centerline, and a groove area ratio of a region on the second side of a second centerline dividing the outside intermediate land section in the widthwise direction of the tire is higher than a groove area ratio of a region on the first side of the second centerline;

the land sections further include a center land section demarcated by the center main grooves, the center land section being provided with sipes that extend into the center land section from a second side edge of the center land section adjoining the center main groove on the second side, the sipes being closed within the center land section and separated from one another with a prescribed spacing in the circumferential direction of the tire, and the center land section not being provided with sipes on a first side edge of the center land section adjoining the center main groove on the first side; and the inside shoulder lug groove has a terminal end that is closed such that the inside shoulder lug groove does not communicate with the inside main groove, and the outside shoulder lug groove has a terminal end that is closed such that the outside shoulder lug groove does not communicate with the outside main groove.

* * * * *